United States Patent
Gunti et al.

(10) Patent No.: US 10,725,770 B2
(45) Date of Patent: Jul. 28, 2020

(54) HOT-SWAPPING OPERATING SYSTEMS USING INTER-PARTITION APPLICATION MIGRATION

(71) Applicant: VMware, Inc., Palo Alto, CA (US)

(72) Inventors: Mukund Gunti, Sunnyvale, CA (US); Vishnu Sekhar, Sunnyvale, CA (US); Bernhard Poess, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 599 days.

(21) Appl. No.: 14/642,656

(22) Filed: Mar. 9, 2015

(65) Prior Publication Data

US 2016/0210141 A1 Jul. 21, 2016

Related U.S. Application Data (60) Provisional application No. 62/105,128, filed on Jan. 19, 2015.

(51) Int. Cl.
*G06F 8/656* (2018.01)
*G06F 9/4401* (2018.01)
*G06F 9/455* (2018.01)

(52) U.S. Cl.
CPC ............ *G06F 8/656* (2018.02); *G06F 9/4406* (2013.01); *G06F 9/45558* (2013.01); *G06F 2009/4557* (2013.01); *G06F 2009/45575* (2013.01)

(58) Field of Classification Search
CPC .. G06F 7/78; G06F 8/00–78; G06F 9/44–455; G06F 11/36; G06F 8/656; G06F 9/4406; G06F 9/45558; G06F 2009/4557; G06F 2009/45575

USPC .................................................. 717/168–173
See application file for complete search history.

(56) References Cited

U.S. PATENT DOCUMENTS

| | | | |
|---|---|---|---|
| 6,961,941 B1 | 11/2005 | Nelson et al. | |
| 7,814,495 B1 | 10/2010 | Lim et al. | |
| 7,818,726 B2 | 10/2010 | Apparvoo et al. | |
| 8,181,007 B2 | 5/2012 | Liu | |

(Continued)

FOREIGN PATENT DOCUMENTS

WO  WO 2014/149583  9/2014

OTHER PUBLICATIONS

Appavoo et al., "Enabling autonomic behavior in systems software with hot swapping," 2003, IBM Systems Journal, p. 60-76. (Year: 2003).*

(Continued)

*Primary Examiner* — Qing Chen (57) ABSTRACT

In a process for hot-swapping operating systems, an original operating system (OS) instance is executing on and controlling hardware of a computer. The original OS instance generates updated launch code that defines a division of the hardware into a source logical partition and a target logical partition. The original OS instance quiesces processes hardware of the target logical partition so that the original OS instance and an application running thereon are contained by the source logical partition. The original OS instance launches the updated OS instance so that it executes on the target logical partition. The application is moved from the source logical partition to the target logical partition. The original OS instance terminates. The updated OS instance claims hardware freed by the termination.

26 Claims, 6 Drawing Sheets

(56) References Cited

U.S. PATENT DOCUMENTS

| | | | |
|---|---|---|---|
| 9,396,016 B1 | 7/2016 | Marquardt et al. | |
| 2005/0071811 A1* | 3/2005 | Appavoo | G06F 8/67 |
| | | | 717/122 |
| 2006/0242442 A1 | 10/2006 | Armstrong et al. | |
| 2006/0294337 A1* | 12/2006 | Hartung | G06F 3/0607 |
| | | | 711/173 |
| 2007/0061372 A1* | 3/2007 | Appavoo | G06F 8/656 |
| 2008/0184373 A1 | 7/2008 | Traut et al. | |
| 2008/0320194 A1* | 12/2008 | Vega | G06F 9/4812 |
| | | | 710/263 |
| 2009/0288087 A1* | 11/2009 | Ringseth | G06F 9/4881 |
| | | | 718/102 |
| 2010/0125845 A1 | 5/2010 | Sugumar et al. | |
| 2011/0119670 A1 | 5/2011 | Sugumar et al. | |
| 2011/0153872 A1* | 6/2011 | Nath | G06F 9/455 |
| | | | 710/10 |
| 2012/0011520 A1* | 1/2012 | Filali-Adib | G06F 9/45558 |
| | | | 719/327 |
| 2012/0017029 A1* | 1/2012 | Santos | G06F 12/1081 |
| | | | 711/6 |
| 2012/0017031 A1 | 1/2012 | Mashtizadeh et al. | |
| 2012/0054486 A1 | 3/2012 | Lakkavalli et al. | |
| 2012/0216187 A1 | 8/2012 | Ben-Yehuda et al. | |
| 2012/0254860 A1 | 10/2012 | Bozek et al. | |
| 2012/0291021 A1 | 11/2012 | Banerjee et al. | |
| 2013/0232486 A1 | 9/2013 | Chen et al. | |
| 2013/0263118 A1 | 10/2013 | Kannan et al. | |
| 2014/0019968 A1 | 1/2014 | Deng et al. | |
| 2014/0149635 A1 | 5/2014 | Bacher et al. | |
| 2014/0229943 A1 | 8/2014 | Tian et al. | |
| 2014/0282539 A1 | 9/2014 | Sonnek | |
| 2015/0169329 A1* | 6/2015 | Barrat | G06F 9/5077 |
| | | | 713/2 |
| 2015/0212844 A1 | 7/2015 | Tsirkin et al. | |
| 2015/0324227 A1 | 11/2015 | Sizemore | |
| 2015/0331692 A1* | 11/2015 | Schekochikhin | G06F 9/441 |
| | | | 713/2 |
| 2016/0026489 A1 | 1/2016 | Maislos et al. | |
| 2016/0092678 A1* | 3/2016 | Probert | G06F 21/55 |
| | | | 713/193 |
| 2016/0139946 A1 | 5/2016 | Gardner et al. | |
| 2016/0277308 A1 | 9/2016 | Challa et al. | |
| 2016/0277309 A1 | 9/2016 | Challa et al. | |
| 2016/0277311 A1 | 9/2016 | Challa et al. | |

OTHER PUBLICATIONS

Nigel Griffiths, "The LPAR term is dead—Long live the Virtual Server / Machine", AIXpert Blog, Apr. 27, 2011, downloaded from: https://www.ibm.com/developerworks/community/blogs/aixpert/entry/the_lpar_term_is_dead_long_live_the_virtual_server_machine42?lang=en.

Jack Alford, "AIX 6.1 Workload Partitions, Basic management of Workload Partitions in AIX", IBM developerWorks, Nov. 20, 2007, downloaded from https://www.ibm.com/developerworks/aix/library/au-workload/.

IBM, "Mainframe hardware: Logical partitions (LPARs)", IBM Knowledge Center, 2010, p. 30, USA, downloaded from https://www.ibm.com/support/knowledgecenter/zosbasics/com.ibm.zos.zmainframe/zconc_mfhwlpar.htm.

Michael Ball, "What's the difference between a Virtual Machine and a Container?", InfoSec Musings, Apr. 27, 2015, downloaded from http://security-musings.blogspot.com/2015/04/whats-difference-between-virtual.html.

Mark Lambert, "What's the difference between an LPAR and a Virtual Machine?", Quora, Apr. 5, 2016, downloaded from https://www.quora.com/Whats-the-difference-between-an-LPAR-and-a-Virtual-Machine.

Brasser, et al., "Swap and Play Live Updating Hypervisors and Its Application to Xen", 2014.

Chen, et al., "Live Updating Operating Systems using Virtualization", 2006.

* cited by examiner

HOT-SWAPPING OPERATING SYSTEMS USING INTER-PARTITION APPLICATION MIGRATION

This application claims priority based on U.S. Provisional Patent Application 62/105,128, filed 2015 Jan. 19.

BACKGROUND

Software updates are frequently provided to add features, fix bugs, and address an ever-expanding range of security threats. Updating typically involves downloading update files and restarting the program to be updated. When the program to be updated is an operating system that interfaces with hardware, then the hardware is rebooted to launch the updated operating system.

Interruptions associated with rebooting a computer can be inconvenient and even totally unacceptable. For example, some computers are used to run mission-critical applications for which such interruptions must be avoided. Accordingly, an application can be migrated to a second computer while the operating system on the first computer is updated. Once the update is complete, the application may be migrated back to the computer running the updated operating system.

DETAILED DESCRIPTION

It is not always possible to have a spare computer available to back up a computer while its operating system is being updated. There might be no other computer around, or the ones that are around may be fully occupied or incompatible with the application to be migrated. Alternatively, the computer may be in a form from which applications are not readily migrated, e.g., a smartphone or other computerized appliance. Accordingly, the present invention provides for "hot-swapping" an original instance of an operating system with an updated instance of the operating system such that there is no interruption due to rebooting the hardware.

Figure 1:
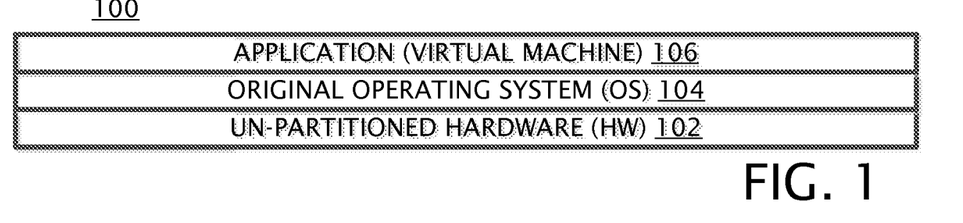
FIG. 1 is a schematic diagram of a computer prior to implementation of an update process.
Figure 3:
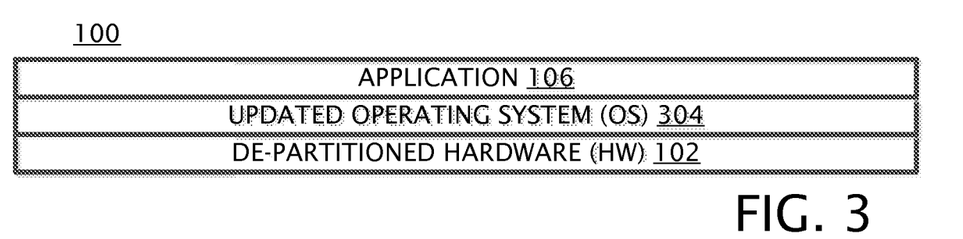
FIG. 3 is a schematic diagram of the computer of FIG. 1 after implementation of the update process.

As shown in FIG. 1, an initially un-partitioned computer 100 includes hardware 102 prior to it being partitioned, an original bare-metal operating-system (OS) instance 104 executing on and controlling hardware 102, and an application 106 executing on original OS instance 104. As shown in FIG. 3, subsequently de-partitioned computer 100 includes hardware 102 after a partition has been removed, an updated bare-metal OS instance 304 executing on hardware 102, and application 106 executing on updated operating system 304. In effect, updated OS instance 304 has been "swapped" for the original OS instance 104. The swapping is "hot" in that it is achieved without shutting down or rebooting hardware 102. As a result, application downtime is minimized.

Figure 2:
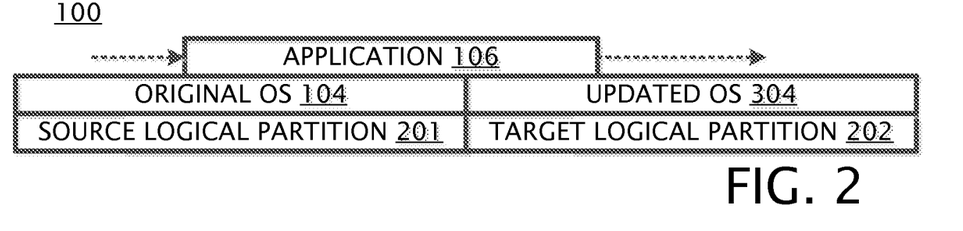
FIG. 2 is a schematic diagram of the computer of FIG. 1 during a migration of an application in the course of the update process.

Computer 100 is shown logically partitioned in FIG. 2 at a time intermediate between the times respectively represented in FIGS. 1 and 3. Hardware 102 has been logically partitioned to define a "source" logical partition 201 and a "target" logical partition 202. Original OS instance 104 is executing on logical partition 201, while updated OS instance 304 is executing on logical partition 202. In other words, original OS instance 104 and updated OS instance 304 are executing in parallel on hardware 102, the same hardware that was formerly exclusively controlled by original OS 104. The ability to run two operating-system instances directly (as opposed to within virtual-machine instances) on the hardware that normally supports one OS instance enables updating an OS without a hardware reboot or a transfer of an application to another computer. In FIG. 2, application 106 is in the process of being migrated from source logical partition 201 to target logical partition 202. As indicated in FIG. 1, in some scenarios application 106 can be a virtual machine.

Figure 4:
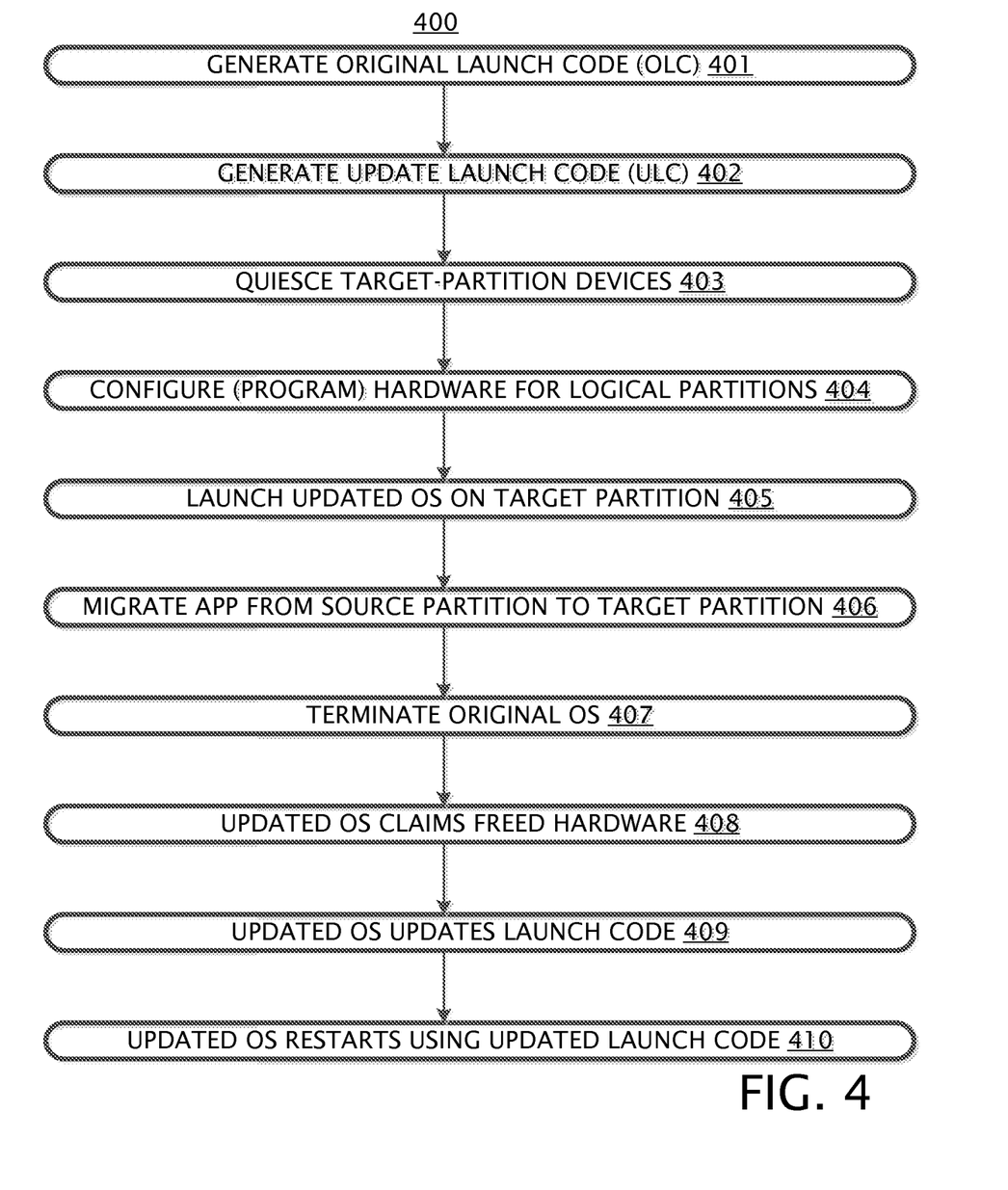
FIG. 4 is a flow chart of the update process that results in the configuration of the computer of FIG. 3.

A process 400 by which an operating system for a computer, such as computer 100, can be updated is flow charted in FIG. 4. At 401, starting from the state represented in FIG. 1, original launch code (OLC) 501 (FIG. 5) is generated, e.g., as computer 100 is powered-ON or hard booted. Process 400 is applicable to computers in the form of servers, standalone computers, laptop computers, tablet computers, smartphones and other computer-based devices and appliances.

During a power-ON or hardware reboot, a multi-stage boot process gathers and generates computer-component data identifying and characterizing hardware and software components of the host computer. The software components identified can include an operating system kernel, device drivers, and applications. The identified hardware devices can include memory devices, processors (CPUs), network interface cards (NICs), and storage controllers (SCs). This computer-component data can be passed from stage to stage and made available to the operating system. In addition to the computer-component data, OLC 501 can include executable code for launching an instance of the original OS.

Figure 5:
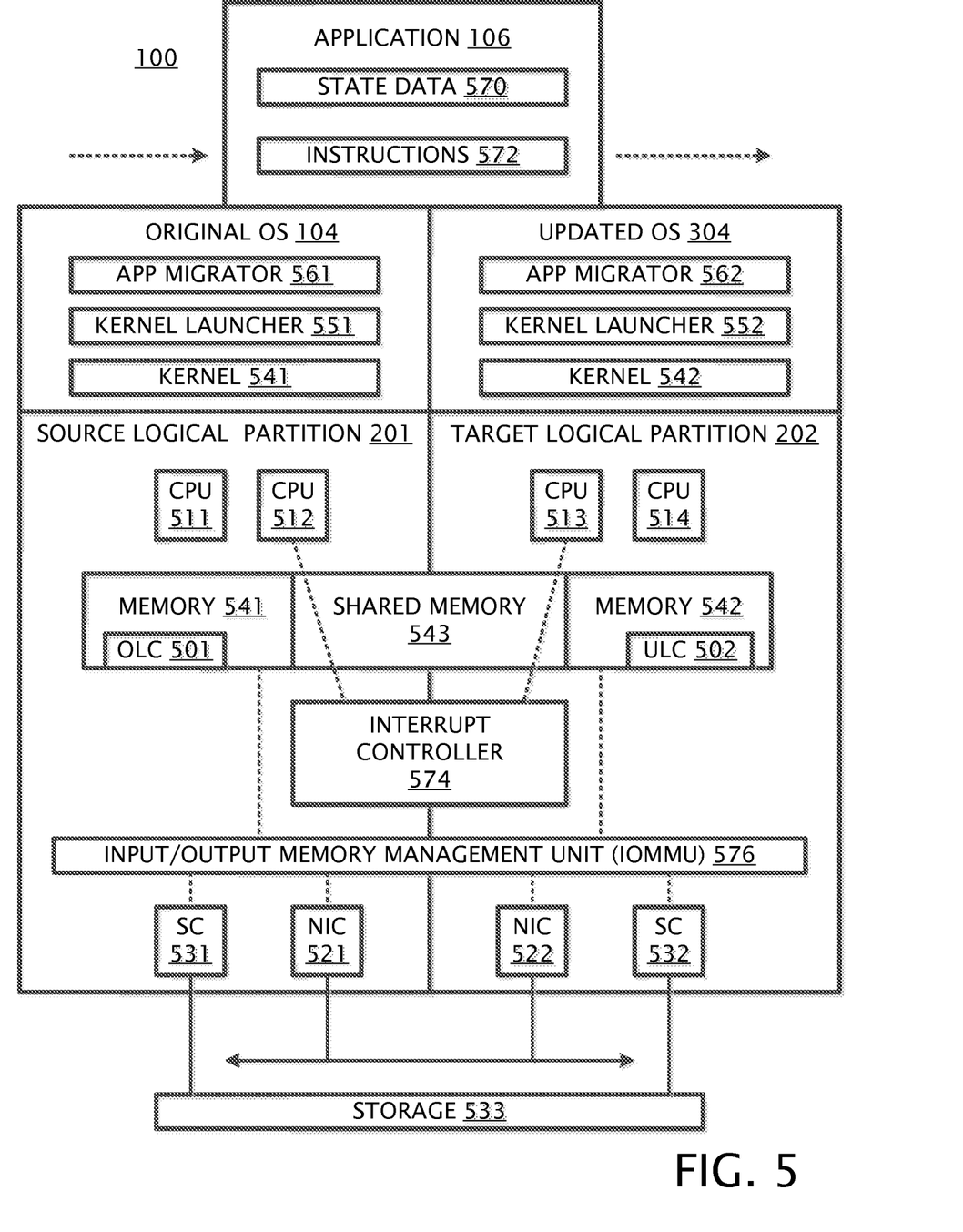
FIG. 5 is a more detailed diagram of the computer of FIG. 1 during the migration of the application represented in FIG. 2.

OLC 501 encapsulates a boot image of the original OS along with associated details so that they can be passed from one bootloader to another. OLC 501 can conform to the Multiboot Specification developed by The Free Software Foundation. CPUs can be identified in OLC 501 in terms of Advanced Programmable Interrupt Controller (APIC) identifiers, while NICs and SCs can be identified using Peripheral Component Interconnect (PCI) identifiers, for example. An operating system can leverage this computer component data to restore a freshly booted state without going through the multiple boot stages required to generate the computer-component data in the first place. In other words, the computer-component data permits a relatively swift software reboot, obviating a need for a more disruptive hardware reboot.

Figure 6:
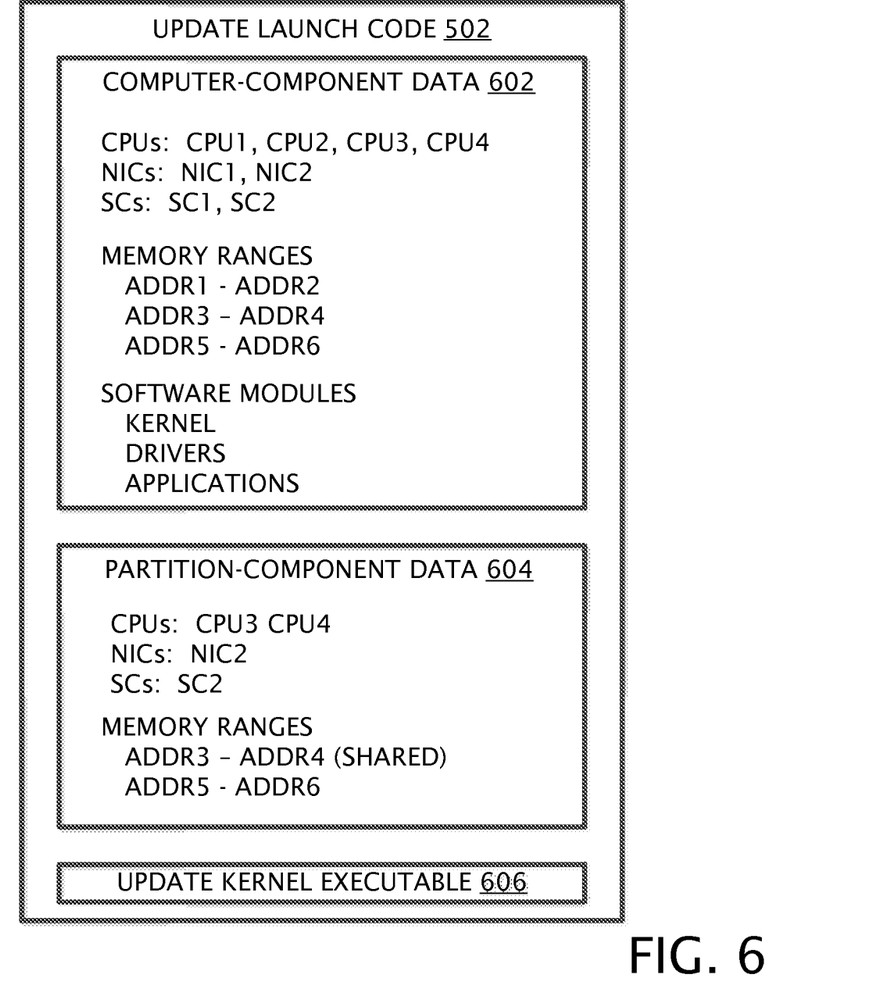
FIG. 6 is a schematic representation of update launch code used in the process of FIG. 4.

At 402 (FIG. 4), original OS instance 104 generates update launch code (ULC) 502 (FIG. 5), e.g., by copying and extending OLC 501. As shown in FIG. 6, ULC 502 can include computer-component data 602, partition-component data 604, and update kernel executable 606. Computer component data 602 can be the same computer-component data included in OLC 501. Computer-component data 602 includes identifiers CPU1, CPU2, CPU3, and CPU4 respective for CPUs 511, 512, 513, and 514 (FIG. 5). Computer-component data 602 includes identifiers NIC1, NIC2, SC1 and SC2 respectively for NIC 521, NIC 522, SC 531, and SC532. Computer-component data includes address range identifiers: ADDR1-ADDR2, ADDR3-ADDR4, and ADDR5-ADDR6 respectively for memories 541, 543, and 542. Computer-component data 602 also lists software with which computer 100 configured, e.g., a kernel, device drivers, and applications. In practice, the CPUs, memory ranges, NICs, and SCs for hardware 102 may be listed in Advanced Configuration and Power interface (ACPI) tables in computer-component data 602.

ULC 502 is extended relative to OLC 501 in that it provides partition-component data 604, identifying which computer devices are to be initially included in a target logical partition in which an updated OS instance is to run. Thus, partition-component data 604 includes identifiers CPU3, CPU4, NIC2 and SC2 respectively identifying CPU 513, CPU 514, NIC 522, and SC 532. Partition-component data also specify memory ranges ADDR3-ADDR4 and ADDR5-ADDR6 respectively corresponding to memories 543 and 542. A memory range, e.g., ADDR3-ADDR4 may be designated as "shared", indicating that it is to be accessible by both original OS instance 104 and updated OS instance 304; in contrast, address range ADDR5-ADDR6 is to be used exclusively by updated OS instance 304.

More generally, freeing up sufficient memory resources for the target partition and updated OS may be achieved either statically, by reserving memory in the computer-component data (representing unpartitioned hardware) at boot-time to prevent the original OS from using it, or dynamically, by memory reclamation methods in the original OS at run-time, as part of 402. Typically, the devices excluded from the target logical partition would be included in the source logical partition. Once the update ULC 502 is derived, it is stored at a default location, e.g., in the first 4 gigabytes (GB) space as specified by the Multiboot Specification.

Updated kernel executable 606 includes a boot image of a kernel for the updated OS, along with drivers for accessing portions of the updated OS stored elsewhere, e.g., on network-attached storage (NAS). In another example, an ULC includes a boot image for the entire updated operating system.

At 403 (FIG. 4), original OS instance 104 quiesces target-partition devices to be assigned to target logical partition 202. For example, processes executing on CPUs 513 and 514 are halted or allowed to lapse, as are accesses involving NIC 522 and SC 532. The applications to which the processes belong can continue executing on or be migrated to the remaining still-active CPUs, e.g., CPUs 511 and 512. However, no new workloads are scheduled by original OS instance 104 on the quiesced CPUs.

At 404, hardware 102 is programmed, i.e., configured, to support the logical partitions. For example, NIC 522 can be assigned a new network address, and SC 532 can be programmed with a new virtual World-Wide Name and to access different storage locations. In addition, an Input-Output Memory Management Unit (IOMMU) 576 can be programmed to protect each partition's memory from access by devices associated with the other partition. The source and target partitions share IOMMU 576 to program control for the devices that each side is driving. Other embodiments forego configuring an IOMMU, e.g., some embodiments lack an IOMMU.

Figure 7:
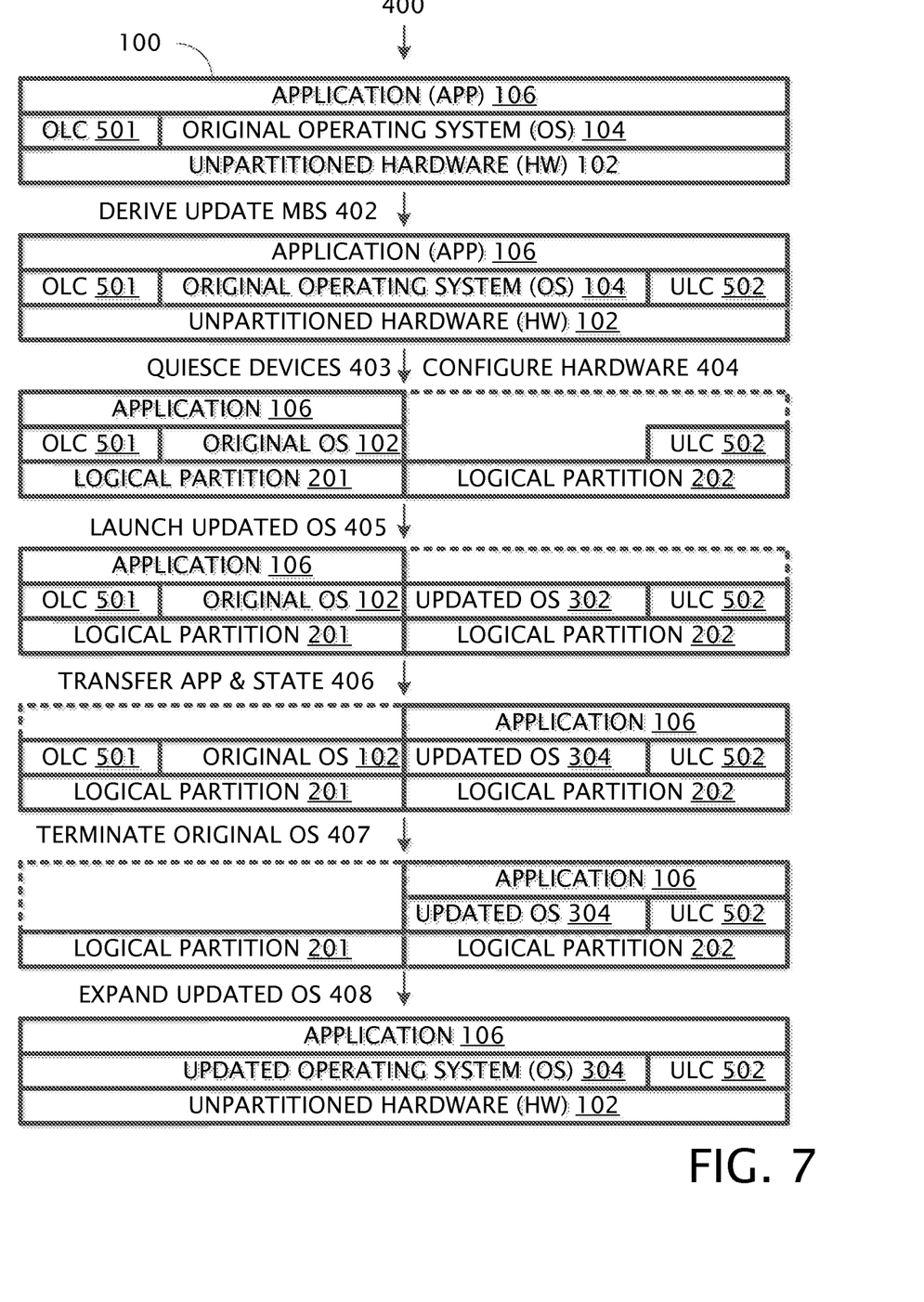
FIG. 7 is a combination flow chart and state diagram of the process of FIG. 4.

In effect, the hardware of computer 100 is partitioned, e.g., to define source logical partition 201 and target logical partition 202 (FIG. 5) so that one partition, e.g., target logical partition 202, conforms to ULC 502. Depending on the embodiment, the ULC can be determined: 1) before the hardware is partitioned, 2) after the hardware is partitioned, or 3) while the hardware is being partitioned. To implement the partitioning, original OS 104 halts processes on devices (e.g., CPUs 513, 514, NIC 522, and SC 532) destined for logical partition 202. The resulting state of system 100 is represented in FIG. 7 as a result of action 403. Original OS instance 104 and application 106 are located in source logical partition 201, while no OS or application is assigned to target logical partition 202 prior to action 405.

For example, storage controllers 531 and 532 are used for accessing storage 533, which can include hard disks and solid-state disks. In computer 100, storage controllers 531 and 532 are normally used in parallel, e.g., to provide greater bandwidth, one of them, e.g., storage controller 532, can be quiesced so that it becomes available for target logical partition 202, while the other, e.g., storage controller 531, can handle the full load during subsequent update steps. Similarly, if NIC 522 normally serves as a backup for NIC 521, then NIC 522 can be relieved of backup duty so that NIC 522 is available for use in target logical partition 202.

At 405 (FIGS. 4 and 7), original OS instance 104 triggers update launch executable 606 (FIG. 6). Accordingly, updated OS instance 304 is launched on target logical partition 202, as indicated in FIG. 7. As shown in FIG. 5, original OS instance 104 includes a kernel 541, a kernel launcher 551, and an application (app) migrator 561. Similarly, updated OS instance 304 includes a kernel 542, a kernel launcher 552, and an app migrator 562. Kernel launchers 551 and 552 roughly correspond to kernel executives used in some contexts to allow soft reboots, in this case, it is "original" kernel launcher 551 that triggers the boot to updated OS instance 304. In an alternative embodiment, original and updated OS instances share a memory-resident kernel launcher. Note that actions 401-405 can be iterated to allow various numbers of OS instances to run on the hardware originally controlled solely by one OS instance.

Figure 8:
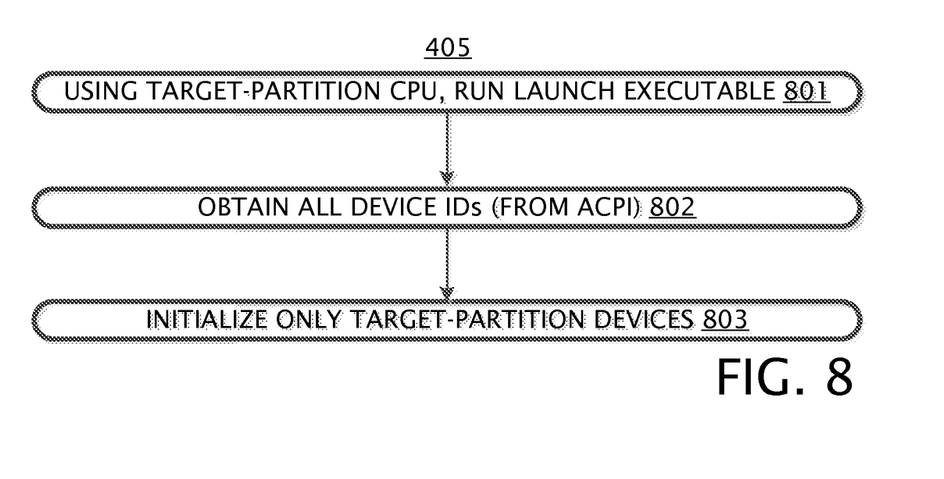
FIG. 8 is a flow chart of sub-actions that can be taken in the course of launching an updated operating system in the process of FIG. 4.

Action 405 is further detailed in FIG. 8. At 801, launch executable 606 is run using a CPU, e.g., CPU 513, of target logical partition 202. At 802, device identifiers for all CPUs, NICs, and SCs of the computer are obtained, e.g., from computer-component data 602. For example, the device identifiers may be provided in ACPI tables included in update launch code 502. At 803, "updated" kernel 542 initializes devices (other than the launch CPU, which is already initialized) identified in partition-component data 604. Devices listed in computer-component data 602 but not in partition-component data 604 are not initialized, at this point; of course they may already be active in the source logical partition. In the illustrated embodiment, the updated instance boots up with network and storage controllers. Additional devices, e.g., keyboard, mouse, video, etc., can be migrated to the updated OS instance once the original OS instance is shutdown.

At 406, original and updated OS instances 104 and 304 cooperate to migrate application 106 from partition 201 to partition 202. More specifically, the respective app migrators 561 and 562 (FIG. 5) cooperate to effect the transfer of application state data 570 from source logical partition 201 to target logical partition 202. The transfer can take place via shared memory 543 and/or over a network via NICs 521 and 522, FIG. 5. An Inter-Processor Interrupt (IPI) can be used to inform the updated OS instance of message arrivals. This migration is represented in FIGS. 2 and 5. Depending on the implementation, the migration may or may not involve an actual transfer of application instructions 572 between partitions.

As an alternative to transferring application instructions, a new instance of an application can be installed in target logical partition 202. Transfer of state data 570 between partitions allows the new instance to resume from a state achieved by an application prior to migration. Interruptions are minimized as the new instance does not have to repeat data-processing steps that led to the halted state to resume from the halted state. The result of the migration is shown in FIG. 7 after action 406.

Hardware may also be migrated from source logical partition 201 to target logical partition 202. For example, in some scenarios, there may be more than one application (e.g., virtual machine) to migrate. As applications are migrated, it may be desirable to reallocate hardware resources between partitions to match the changes in workloads handled by the partitions. Even if there is only one application, hardware may be gradually migrated to the target partition to prepare for an eventual switch of control from the original OS instance to the updated OS instance.

Figure 9:
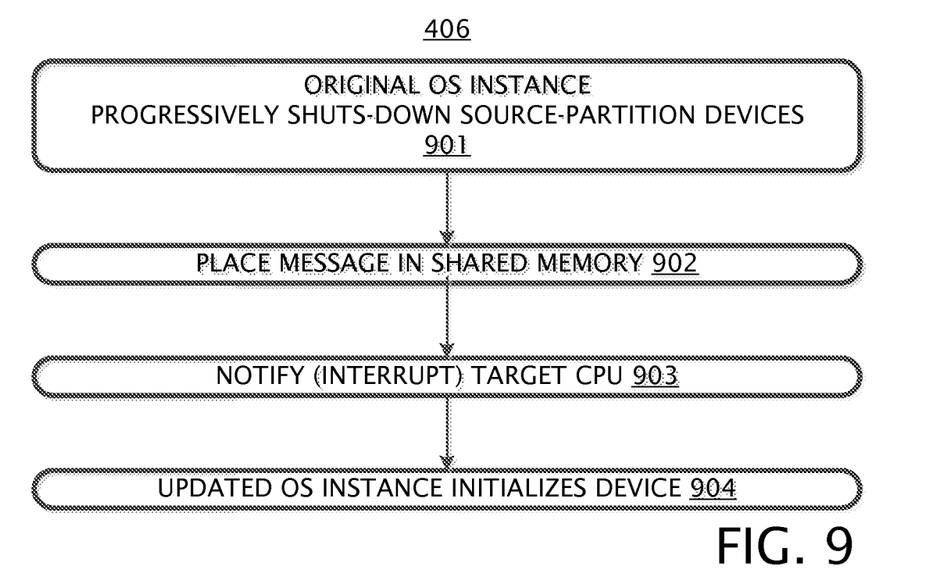
FIG. 9 is a flow chart of sub-actions that can be taken in the course of migrating an application as shown in FIGS. 2 and 5.

Accordingly, the migration of application 106 at action 406 can include progressive migration of hardware from source logical partition 201 to target logical partition 202, as flow charted in FIG. 9. At 901, the original OS instance 104 can progressively shut down devices. Upon shutting down a device, at 902, original OS instance 104 can post a message in shared memory indicating the availability of the device. This message can identify the device that is now available for re-initialization. At least one CPU can remain active to post the messages. Just before the last CPU is shut down, it can post a message indicating that it is about to be shutdown. In other words, placing a message at 902 can precede shutting down the corresponding device at 901, at least for the last CPU.

Application migrators 561 and 562 can be modeled after vMotion, a utility available from VMware and used to migrate virtual machines, which are considered, herein, as a special case of applications. Virtual machines can preserve their own states, and application migrators 561 and 562 can migrate applications that preserve their own states or that allow operating systems to track their states. Actual transfer of information can take place using NICs, as it would if a transfer were to a different computer. Alternatively, or in addition, transfer can take place using shared memory 543. The availability of shared memory for communications between partitions can be particularly useful in embodiments in which there is only one NIC, in which case the network connections cannot readily be used for inter-partition communications.

At 903, an IPI directed to a CPU in target logical partition 202 can alert the updated OS instance of the availability of the message. At 904, the updated OS instance can initialize the device identified in the message. In the case of memory, the free memory is simply added to the current free memory. In the case of a CPU, the CPU is added to the list of active CPUs and started as a slave in the target partition. In the case of the last CPU, the message can indicate that a delay may be required before the CPU is available to the target logical partition. For the case of an NIC or SC, the device invokes a hot-plug mechanism in the updated OS instance, in response to which, an appropriate device driver is loaded. During updating, there can be hot-plug events, e.g., as new devices are added to computer 100. Accordingly, at any given stage of process 400, one of the two logical partitions is assigned responsibility for servicing hot-plug events.

At 407 (FIGS. 4 and 7), original kernel launcher 551 (FIG. 5) terminates original OS instance 104, freeing the devices assigned to source logical partition 201. The result of the termination is shown in FIG. 7. At 408, updated OS instance 304 claims for its own use the resources formerly assigned to logical partition 201. For example, NIC 521 can serve as an active standby for NIC 522, and storage controller 531 can be operated in parallel with storage controller 532. Note that computer-component data 602 identifies all devices of hardware 102, so update OS instance 304 can determine what devices are available once original OS 102 terminates. The result of action 408 is shown in FIG. 7 (which corresponds to FIG. 3). Process 400 can be iterated any number of times in succession without a reboot, e.g., to implement successive updates over time.

Once updated OS instance 304 claims hardware at 408, updated launch code 502 is no longer current. Accordingly, updated OS instance 304 updates ULC 502 at action 409 to correspond to the current hardware configuration of computer 102. The configuration of computer 100 may be the same as it was when original OS instance 104 was in control, or the configuration may have changed. For example, devices can have been hot-swapped in and/or out of computer 100 during process 400. Once OLC 502 has been updated, it can be used for a soft boot, i.e., relaunch, at 410, of updated OS instance 304 without a hardware reboot. In some embodiments, the ULC is not updated, so that update process ends at action 408.

Hardware 102 includes only one interrupt controller 574, shown in FIG. 5, which cannot be divided readily among logical partitions interrupt controller 574 can be, for example, an "IOAPIC" (Input/Output Advanced Programmable Interrupt Controller) interrupt controller as provided for x86 systems (available from Intel Corporation). Instead, original OS instance 104 and updated OS instance 304 must share interrupt controller 574. Interrupt controller 574 can redirect interrupts from a CPU in source logical partition 201 to a CPU in target logical partition 202. Likewise, original OS instance 104 and updated OS instance 304 share IOMMU 576. Access controls, e.g., semaphores, in shared memory can be used to prevent conflicting accesses, e.g., violations of transactions designed to be atomic (i.e., indivisible). In alternative embodiments, each partition has its own interrupt controller and/or IOMMU.

More generally, computers having only one processor (CPU), only one network interface (NIC), or only one storage controller (SC) pose challenges for migrating operations, in some alternative embodiments, partitions can time-share a CPU, NIC, or SC. In some other embodiments, one OS can use the other OS as an agent for accessing devices. In further embodiments, a run-time bridge can be built between the OS instances to allow sharing of a single device. At the time of switch over, the device driver in the source logical partition is unloaded and reloaded in the target logical partition. In still another embodiment lacking hardware redundancy, the application state can be migrated, the application can be suspended, hardware can be moved, and then the application can be resumed. The disruption to the application would be less than that associated with a hardware reboot.

Herein, "system" refers to an interacting set of elements, wherein the elements may include computer components, atoms, and/or process actions. Herein, "process" refers to a system that involves or results in a physical transformation and in which the interacting elements include actions.

Herein, a "computer" is a machine including: 1) storage media for storing data and instructions for manipulating data; 2) a processor for manipulating data according to the instructions; and 3) communications devices for inputting and outputting data. Herein, "partition" refers to division of a host computer that itself qualifies as a computer but includes less than all components of the host computer. Typically, a partition is one of plural divisions of a computer, wherein each division can execute a respective instance of an operating system. Hardware partitions are defined in hardware and are electrically isolated from each other. Logical partitions are defined in software and are not electrically isolated from each other. At any given time, hardware may be dedicated to a logical partition or shared among logical partitions.

Herein, "device" refers to a hardware component of a computer. Herein, "storage media" refers to non-transitory tangible devices or systems in or on which information can be physically encoded. Examples of storage media include hard disks, solid-state disks, and memory, "Memory" refers to storage media that is directly addressable. "Memory" encompasses both volatile memory, e.g., Dynamic Random Access Memory (DRAM), and non-volatile memory, e.g., flash memory and Read-Only Memory (ROM).

Herein, "processor" and "central processing unit" (CPU) refer to device, collection of devices, or hardware component of a device for executing program instructions. For example, a CPU or processor may be an integrated circuit, a portion (e.g., core) of an integrated circuit, or a collection of integrated circuits.

Herein, an "Input-Output Memory Management Unit" or "IOMMU" is a memory management unit (MMU) that connects a direct memory access-capable (DMA-capable) I/O bus to the main memory. An IOMMU 576 maps device-visible virtual addresses (also called device addresses or I/O addresses in this context) to physical addresses.

Herein, "program" refers to an ordered set of computer-executable instructions that, when encoded in storage media, defines a functional relationship among hardware elements of a computer. Operating systems, drivers, and applications are examples of programs. There can be multiple identical or similar, but separately encoded, instances of a program, e.g., instances of Microsoft Word can run on different computers.

Herein, "operating system" refers to a program designed to control hardware and to serve as an interface between an application program and the hardware. Herein, the terms "application program" and "application" refer broadly to any program that accesses hardware via an operating system. "Application", as used herein, encompasses programs, such as Microsoft Word, conventionally regarded as applications, but also encompasses virtual machines (e.g. running on a hypervisor, i.e., a virtualizing operating system), and process containers. An operating system executing in a virtual machine can be referred to herein as a "guest operating system", while an operating system that interfaces directly (as opposed to via another operating system) with hardware is referred to herein as a "bare-metal" operating system.

Herein, "launching" refers to a process of converting something, e.g., a program instance, from an inactive or dormant state to an active state. "Terminating" is a process of converting something, e.g., an operating system instance, from an active state to an inactive or dormant state. "Quiescing" refers to allowing hardware to halt processing, e.g., by withholding processes from the hardware. Herein, an "interrupt" is a message to a processor that causes the processor to interrupt one process to attend to another.

Herein, "migrating" refers to transferring the functionality of a program, e.g., application, from one computer or partition to another computer or partition. A migration can involve transferring of program instructions between computers or partitions; alternatively or in addition, migration can involve transferring program state information from one instance of a program executing in a first computer/partition to a second instance of a program executing in a second computer/partition.

Herein, the terms "original" and "updated", as applied to operating system instances, are defined relative to each other. The original OS instance is the instance replaced, while the updated OS instance is the instance that replaces the original operating system instance. The updated OS instance may be an instance of the same or of a different operating system than the operating system of which the original OS instance is an instance. The updated OS instance may be older or newer than the original OS instance.

Herein, "boot" refers to a process of initializing a computer. For example, when a computer is powered ON, the computer can conduct a series of power ON self tests (POSTs) to ensure proper functioning of devices. A "reboot" involves restarting a computer from a power ON state. Reboots can be either hard (aka cold), in which case the power to the system is physically turned off and back on again, triggering POSTs. Alternatively, a reboot can be soft (aka warm) where the system restarts without the need to interrupt the power or conduct POSTs. Booting is complete when the normal, operative, runtime environment is attained. A "boot loader" is a computer program that loads an operating system or some other system software for the computer after completion of the POSTs; it is the loader for the operating system itself, which has its own loader for loading ordinary user programs and libraries.

Herein, "hot swap" refers to a process in which one computer component is replaced by another computer component without shutting the host computer down. Conventionally, the term is applied to hardware components, e.g., hard disks. Herein, the term is extended to cover operating systems as the processes disclosed herein permit replacement or update of an operating system instance while avoiding the hardware shutdown typically required to replace or update an operating system instance.

In this Specification, related art may be discussed for expository purposes. Related art labeled "prior art", if any, is admitted prior art. Related art not labeled "prior art" is not admitted prior art. The present invention is applicable to a variety of device types including general-purpose computers, servers, laptops, tablets, smartphones and other computerized appliances. In addition to the examples presented herein, other variations upon and modifications to the illustrated embodiments are within the scope of the following claims.

What is claimed is:
1. A process comprising:
generating and storing, by an original operating-system (OS) instance controlling hardware devices of a computer, update launch code including,
computer-device identifiers identifying a computer set of devices included in the computer, partition-device identifiers identifying a target subset of the computer set, the target subset including devices to be initially included in a target logical partition of the computer, and executable launch code for launching an update OS instance;

quiescing, by the original OS instance, the devices of the target subset so that the original OS instance is executed on a source logical partition of the computer, the source logical partition including a source subset of the computer set;

launching, by the original OS instance and using the executable launch code, the updated OS instance on the target logical partition so that each of the original OS instance and the updated OS instance run on the hardware previously controlled by the original OS instance; and moving, by the original OS instance and the updated OS instance, an application that had been executing on the original OS instance from the source logical partition to the target logical partition so that the application executes on the updated OS instance.

2. The process of claim 1 further comprising:
terminating the original OS instance; and
claiming, by the updated OS instance after the terminating, devices on which the original OS was executing after the quiescing and prior to the terminating.

3. The process of claim 1 wherein the launching is performed by a memory-resident kernel launcher that, during the moving, is shared by the original OS instance and the updated OS instance.

4. The process of claim 1 wherein the moving includes passing application state information from the original OS instance to the updated OS instance via shared memory shared by the original OS instance with the updated OS instance or via a network external to the computer.

5. The process of claim 1 further comprising configuring an input-output memory management unit (IOMMU) to protect memory of each of the source logical partition and the target logical partition from direct accesses by components of the other of the source logical partition and the target logical partition.

6. The process of claim 1 wherein, in response to posting, by the original OS instance, of a message in the shared memory, an interrupt controller sends an interrupt to a processor in the logical target partition.

7. The process of claim 6 wherein, in response to the message, the updated OS initializes a device identified in the message.

8. The process of claim 1 wherein the computer is of a type selected from a set consisting of general-purpose computer, server, laptop, tablet and smartphone.

9. The process of claim 1 wherein the application is a virtual machine.

10. The process of claim 9 wherein the original OS instance is an original hypervisor instance and the updated OS instance is an updated hypervisor instance.

11. A system comprising non-transitory storage media encoded with instructions that, when executed by hardware, cause the hardware to implement a process including:

generating and storing, by an original operating-system (OS) instance controlling hardware devices of a computer, update launch code including,
computer-device identifiers identifying a computer set of devices included in the computer,
partition-device identifiers identifying a target subset of the computer set, the target subset including devices to be initially included in a target logical partition of the computer, and executable launch code for launching an update OS instance;

quiescing, by the original OS instance, the devices of the target subset so that the original OS instance is executed on a source logical partition of the computer, the source logical partition including a source subset of the computer set;

launching, by the original OS instance and using the executable launch code, the updated OS instance on the target logical partition so that each of the original OS instance and the updated OS instance run on the hardware previously controlled by the original OS instance; and moving, by the original OS instance and the updated OS instance, an application that had been executing on the original OS instance from the source logical partition to the target logical partition so that the application executes on the updated OS instance.

12. The system of claim 11 further comprising:
terminating the original OS instance; and
claiming, by the updated OS instance after the terminating, devices on which the original OS instance was executing after the quiescing and prior to the terminating.

13. The system of claim 11 wherein the launching is performed by a memory-resident kernel launcher that, during the moving, is shared by the original OS instance and the updated OS instance.

14. The system of claim 11 wherein the moving includes passing application state information from the original OS instance to the target OS instance via shared memory shared by the original OS instance with the target OS instance or via a network external to the computer.

15. The system of claim 11 further comprising an input-output memory management unit (IOMMU), the process including configuring the IOMMU to protect memory of each of the source logical partition and the target logical partition from direct accesses by components of the other of the source logical partition and the target logical partition.

16. The system of claim 11 wherein, in response to posting, by the original OS instance, of a message in the shared memory, an interrupt controller sends an interrupt to a processor in the logical target partition.

17. The system of claim 16 wherein, in response to the message, the updated OS initializes a device identified in the message.

18. The system of claim 11 wherein the computer is of a type selected from a set consisting of general-purpose computer, server, laptop, tablet and smartphone.

19. The system of claim 11 further comprising the hardware.

20. The system of claim 11 wherein the application is a virtual machine.

21. The system of claim 20 wherein the original OS instance is an original hypervisor instance and the updated OS instance is an updated hypervisor instance.

22. A computer comprising:
non-transitory media for storing data and instructions for manipulating the data;
a processor for executing the instructions; and
communications devices for transmitting and receiving at least some of the data;

the media, processor and communications devices cooperating to define,
- means for generating and storing update launch code including, the means for generating and storing being associated with an original operating-system (OS) instance controlling hardware devices of a computer,
  - computer-device identifiers identifying devices in a computer set of devices included in the computer,
  - partition-device identifiers identifying devices in a target subset of the computer set, the target subset including devices to be initially included in a target logical partition of the computer, and
  - executable launch code for launching an update OS instance;
- means for quiescing the devices of the target subset so that the original OS instance is executed on a source logical partition of the computer, the source logical partition including a source subset of the computer set;
- means for launching, using the executable launch code, the updated OS instance on the target logical partition so that each of the original OS instance and the updated OS instance run on the hardware previously controlled by the original OS instance; and
- means for moving an application that had been executing on the original OS instance from the source logical partition to the target logical partition so that the application executes on the updated OS instance.

23. The computer of claim 22 wherein the media, processor and communications devices further cooperate to define,
- means for terminating the original OS instance; and
- means for claiming for use by the updated OS after the terminating, devices on which the original OS was executing after the quiescing and prior to the terminating.

24. The computer of claim 22 wherein the computer is of a type selected from a set consisting of general-purpose computer, server, laptop, tablet and smartphone.

25. The computer of claim 22 wherein the application is a virtual machine.

26. The computer of claim 25 wherein the original OS instance is an original hypervisor instance and the updated OS instance is an updated hypervisor instance.

* * * * *